(12) United States Patent
Chauvet

(10) Patent No.: US 9,114,950 B2
(45) Date of Patent: Aug. 25, 2015

(54) SYSTEM FOR CONVEYING A STRIP OF MATERIAL ALONG A PRODUCTION LINE AND PRODUCTION LINE PROVIDED WITH SUCH A SYSTEM

(75) Inventor: Guy Chauvet, Maisons-Laffitte (FR)

(73) Assignee: A R C I L, Puiseux Pontoise (FR)

( * ) Notice: Subject to any disclaimer, the term of this patent is extended or adjusted under 35 U.S.C. 154(b) by 448 days.

(21) Appl. No.: 12/774,088

(22) Filed: May 5, 2010

(65) Prior Publication Data

US 2010/0282573 A1 Nov. 11, 2010

(30) Foreign Application Priority Data

May 6, 2009 (FR) ...................................... 09 02182

(51) Int. Cl.
*B65H 20/20* (2006.01)
*B29C 51/26* (2006.01)

(52) U.S. Cl.
CPC .............. *B65H 20/20* (2013.01); *B29C 51/261* (2013.01)

(58) Field of Classification Search
CPC ...... B65H 20/20; B65H 20/22; B29C 51/261; B41J 11/30; B41J 11/34; B65G 17/46
USPC .......................... 226/6, 53, 74, 75, 82, 83, 87
See application file for complete search history.

(56) References Cited

U.S. PATENT DOCUMENTS

| | | | | |
|---|---|---|---|---|
| 1,763,735 A | * | 6/1930 | Wydom | 226/53 |
| 1,927,062 A | * | 9/1933 | Conn | 226/74 |
| 2,302,704 A | * | 11/1942 | Mabon | 400/616.2 |
| 2,313,888 A | * | 3/1943 | Otis | 192/127 |
| 2,633,354 A | * | 3/1953 | Mixer | 226/75 |
| 3,317,102 A | * | 5/1967 | Lizotte | 226/75 |
| 3,608,801 A | * | 9/1971 | Nystrand | 226/74 |
| 3,977,587 A | * | 8/1976 | Baldyga et al. | 226/74 |
| 4,196,164 A | | 4/1980 | Ward | |
| 4,901,639 A | * | 2/1990 | Actor | 101/142 |
| 4,954,066 A | * | 9/1990 | Leary et al. | 425/388 |
| 4,962,704 A | | 10/1990 | Actor | |
| 5,022,336 A | * | 6/1991 | Iwase | 112/304 |
| 5,110,025 A | * | 5/1992 | Unuma | 226/74 |
| 5,806,745 A | * | 9/1998 | Irwin | 226/74 |
| 6,450,384 B1 | * | 9/2002 | Chinzei et al. | 226/59 |

FOREIGN PATENT DOCUMENTS

| | | |
|---|---|---|
| DE | 3637312 A1 | 5/1988 |
| FR | 2429089 | 1/1980 |

* cited by examiner

*Primary Examiner* — William E Dondero
(74) *Attorney, Agent, or Firm* — Clark & Brody

(57) ABSTRACT

The invention relates to a system (1) for conveying a strip of material (20) along a production line, and a production line provided with such a system, the system (1) comprising:
- a bearing means (10) for the strip of material (20);
- at least one chain (11) provided with means (111) for driving the strip of material (20);
- at least one return wheel (12) for the chain (11) to position the chain (11) facing the strip of material (20);

characterized in that the return wheel (12) also forms a counter-bearing means for the chain (11) to press said chain against the bearing means (10), so that the means (111) of driving the strip of material can penetrate into the strip of material (20).

8 Claims, 3 Drawing Sheets

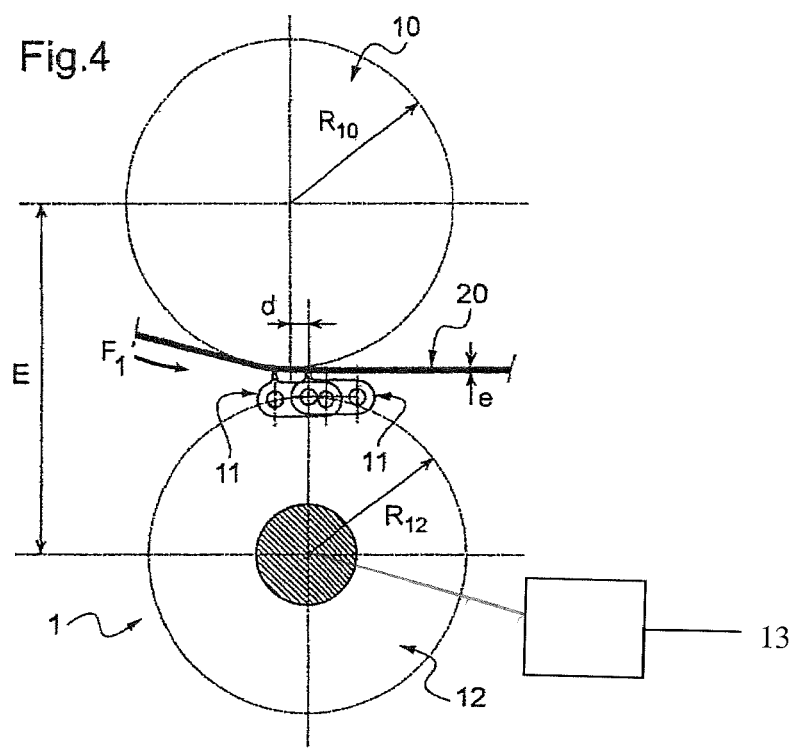
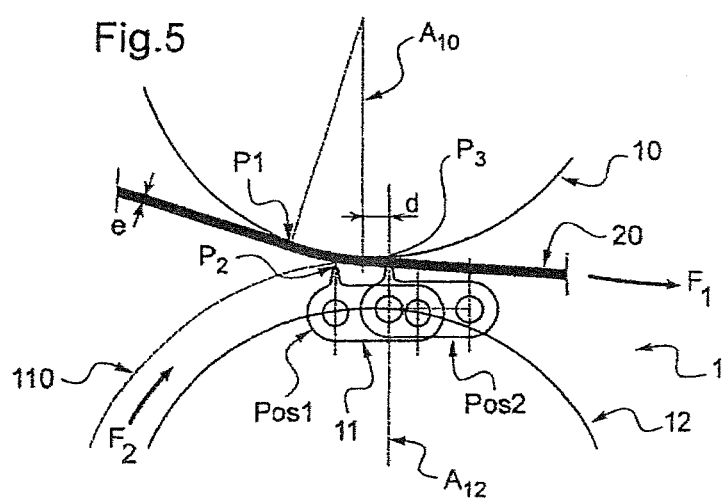

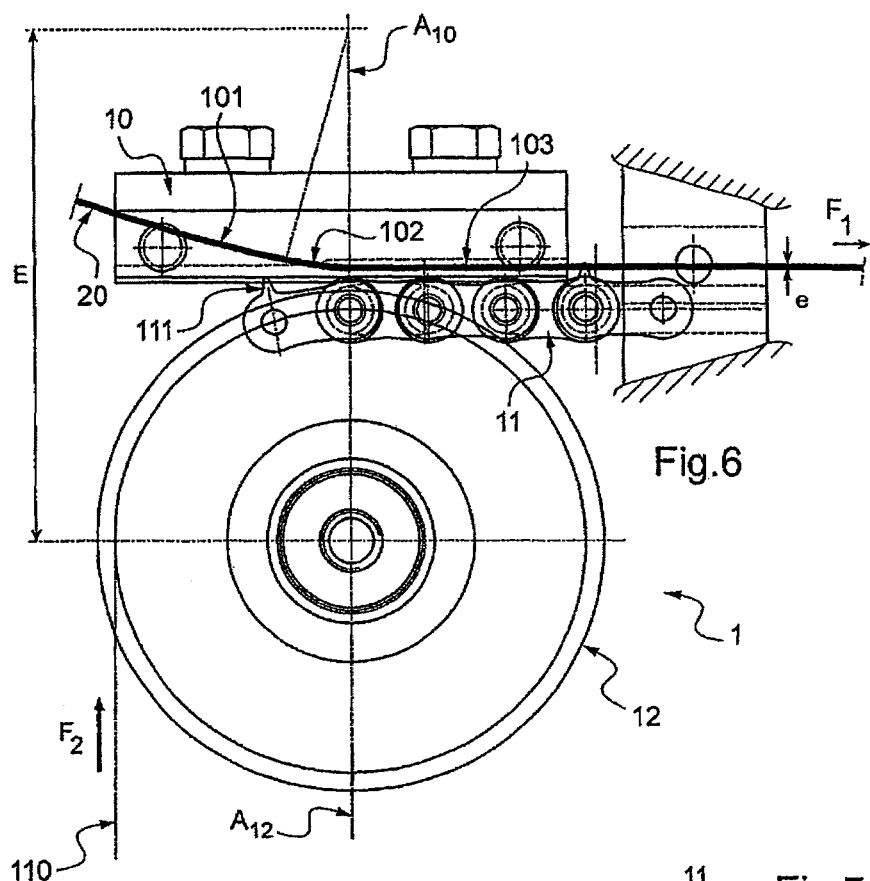
Fig.6
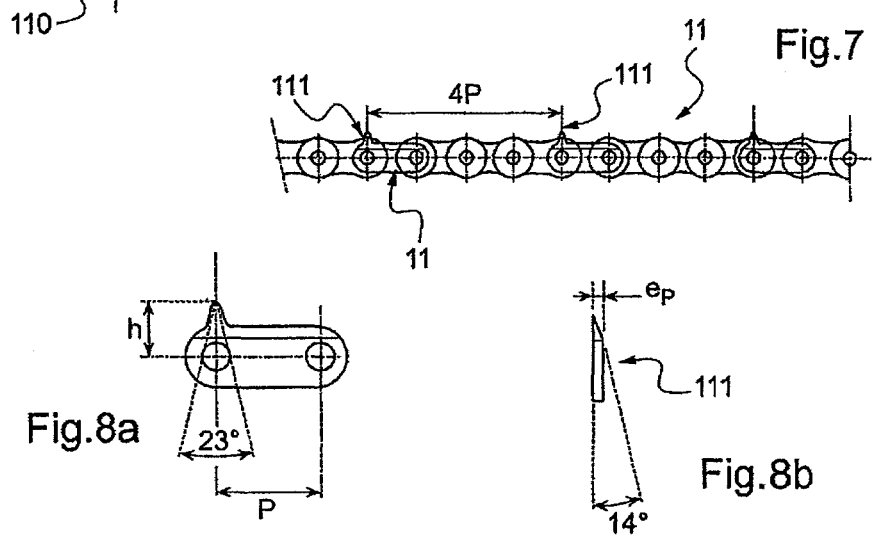
Fig.7
Fig.8a
Fig.8b

SYSTEM FOR CONVEYING A STRIP OF MATERIAL ALONG A PRODUCTION LINE AND PRODUCTION LINE PROVIDED WITH SUCH A SYSTEM

FIELD OF THE INVENTION

The invention relates to a system for conveying a strip of material along a production line.

BACKGROUND ART

The invention applies to all fields for which a strip of material has to be conveyed along a production line. More particularly, the invention relates to the field of the production of food pots, for example yoghurt pots.

In this field, it is in fact necessary to convey a strip of material, more often than not plastic material, along the production line to stations for forming pots from the strip of material.

One known system for conveying such a strip of material comprises a bearing means for the strip of material, one or more link chains, of which certain links include a lateral plate provided with a means for driving the strip of material, and a counter-bearing means for pressing the chain against the bearing means on which the strip of material bears.

The bearing means consists of a roll with a circumferential groove. The means of driving the strip of material provided on certain links is formed by a spike arranged at the centre of the link. The counter-bearing means consists of an anvil which thus has a planar face on which the link bears.

When a strip of material is positioned between the roll and the link chains, the spikes penetrate into the strip of material as the latter moves. The penetration of the spikes into the strip of material is assisted by the anvil which presses the chain against the roll, the spikes penetrating into the strip of material and then fitting into the groove provided in the roll.

The system generally comprises two chains with spikes arranged either side of the roll in order for each side of the strip of material to be driven by the spikes.

One known system as described hereinabove is, for example, represented in FIGS. 1 to 3. FIG. 1 is a diagram representing, from a side view, a system for conveying a strip of material according to the prior art. FIGS. 2 and 3 represent enlarged views of the system of FIG. 1 showing the area of penetration of the spikes into the strip of material to be conveyed, these figures illustrating two positions of the strip of material relative to the chain.

In these FIGS. 1 to 3, the strip of material 20 to be conveyed, the roll 10 forming bearing means for the strip of material 20, the link chain 11 with spikes and the anvil 12 forming counter-bearing means for the chain can be distinguished.

The path of the chain 11 is represented by the broken lines 110. The link chain 11 is returned between the roll 10 and the anvil 12 by virtue of at least one return wheel R. The chain 11 is thus brought into position facing the strip of material by the return wheel R.

The strip of material 20 is conducted roughly in a straight line by means referenced 14, 15.

The chain 11 meets the strip of material 20 to be conveyed along the production line at a counter-bearing area where the spikes 111 of the chain can penetrate into the strip of material 20. This counter-bearing area is situated between the roll 10 and the anvil 12.

Such a system is effective inasmuch as it allows the strip of material to be effectively conveyed along the production line, but it also has a number of drawbacks.

Firstly, this system comprises numerous parts in order to operate, which generate a relatively significant bulk. In particular, it provides for a return wheel R for the chain arranged at a distance from the anvil 12 of the chain 11. By positioning the return wheel R at a distance from the anvil 12, it becomes possible to position the chain 11 substantially parallel to the anvil and, consequently, arrange the spikes 111 perpendicularly to the anvil to facilitate the penetration of the spikes 111 into the strip of material 20.

Secondly, this system implements an anvil as counter-bearing means for the chain, which forms a wear part which must be regularly changed.

The nature and the quantity of parts involved correspondingly increases the service time needed to change or adjust these parts.

Finally, the spikes 111 provided on the links of the chain 11 have dimensions that are not inconsiderable to ensure their good penetration into the strip of material, and a significant quantity of material is therefore needed to make them.

SUMMARY OF THE INVENTION

One objective of the invention is thus to propose a system for conveying a strip of material that makes it possible to reduce the number of parts needed to fulfil its function.

A system for conveying strips of material with which to achieve this objective comprises:
 a bearing means for the strip of material;
 at least one chain provided with means for driving the strip of material;
 at least one return wheel for the chain to position the chain facing the strip of material;
characterized in that the return wheel also forms a counter-bearing means for the chain to press said chain against the bearing means, so that the means of driving the strip of material can penetrate into the strip of material.

This system also has at least one of the following features, taken alone or in combination:
 the bearing means is a roll;
 the return wheel is arranged relative to the bearing means so that there is a positive or zero offset d, taken in the direction of movement of the strip of material, between the rotation axis of the return wheel and the rotation axis of the bearing means;
 the bearing means for the strip of material is a plate having an incurved face;
 the bearing plate comprises:
  a first planar face upstream of the incurved face;
  a second planar face downstream of the incurved face; said planar faces being inclined relative to one another;
 the return wheel is arranged relative to the plate forming the bearing means for the strip of material so that there is a positive or zero offset d, taken in the direction of movement of the strip of material, between the rotation axis of the return wheel and the axis defined as that which is perpendicular to both the rotation axis of the return wheel and to the line of contact between the incurved face of the plate and the planar face situated downstream of the incurved face;
 the return wheel is motor-driven;
 the link chain is a single, double or triple chain;
 the system provides for a chain either side of the bearing means;

the chain has a pitch of between 5 mm and 80 mm, the pitch being defined as the distance separating the two rotation axes of a link of the chain;

the means for driving the strip of material are spikes, each spike being off-centre on one of the two rotation axes of the chain link on which it is mounted;

the means for driving the strip of material have a symmetrical shape;

the means for driving the strip of material each have a height of less than 10 mm.

The invention also proposes a food pot production line comprising such a system for conveying a strip of material, for example a plastic material, which is intended to form said pots.

BRIEF DESCRIPTION OF THE DRAWINGS

The invention will be better understood, and other aims, advantages and features of it will become more clearly apparent from reading the following description given in light of the appended drawings, in which:

FIG. 4 is an enlarged view of the system according to the invention, showing the area of penetration of the spikes into the strip of material to be conveyed by a chain link provided with a spike;

FIG. 5 is an enlarged view of FIG. 4;

FIG. 6 represents a variant embodiment of a system according to the invention;

FIG. 7 represents a chain employed in a system according to the invention;

FIG. 8, comprising FIGS. 8(a) and 8(b), respectively represents a link, provided with a spike, of the chain of FIG. 6 from a front view and the spike of this link from a side view.

DETAILED DESCRIPTION OF THE INVENTION

Figure 1:
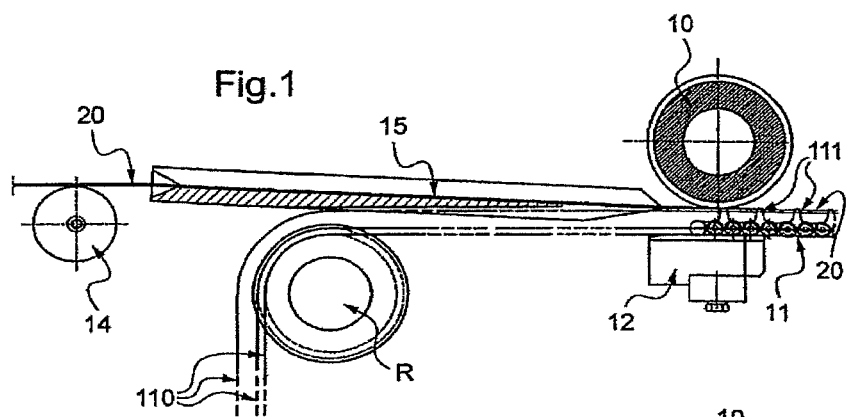
FIG. 1 is a diagram representing, from a side view, a system for conveying a strip of material according to the prior art.

FIGS. 4 and 5 represent a first embodiment of a system for conveying a strip of material according to the invention.

The system 1 comprises a bearing means 10 for the strip of material formed by a roll, at least one chain 11 provided with means 111 such as spikes for driving the strip of material 20, and at least one return wheel 12 for the chain to position the chain 11 facing the strip of material.

The return wheel 12 also forms counter-bearing means for the chain 11 to press said chain against the roll 10, so that the means 111 of driving the strip of material 20 can penetrate into the strip of material.

The return wheel and the counter-bearing means form only one and the same part in the context of the invention. This makes it possible to eliminate a part from the system for conveying the strip of material and save space, since there is no return wheel at a distance from a counter-bearing means.

The roll 10 and the return wheel 12 have a radius that is comparable, but not necessarily identical. For example, the radii of the roll and of the return wheel may be between 90 mm and 120 mm.

The use of the return wheel 12 as counter-bearing means for the chain 11 alters the kinematics of the chain 11 relative to the strip of material 20.

The direction of movement of the strip of material 20 is represented by the arrow $F_1$, represented in FIGS. 4 and 5 for example. The strip of material 20 has a feed angle on the roll 10 relative to the horizontal that is non-zero. Thus, the roll 10 comes into contact with the strip of material 20 at a point $P_1$ situated upstream, with reference to the direction of movement of the strip of material 20, of an axis $A_{10}$ of the roll 10, which is a vertical axis intersecting the rotation axis of the roll 10.

The direction of movement of the chain 11 is represented by the arrow $F_2$. To drive the chain, the system may provide for the return wheel 12 forming counter-bearing means to be motor-driven. The motor driving of the return wheel is shown schematically in FIG. 4 by motor 13.

The path of the point of a spike 111 is referenced 110. This path is the same as that of the strip of material 20 from a point of contact $P_2$ between the spike 111 and the strip of material 20. This point of contact $P_2$ is represented in FIG. 5 when the link 11 is in a first position Pos1.

An offset d between the two rotation axes, taken in the direction of travel $F_1$ of the strip of material, of the return wheel 12 and of the roll 10 is provided. This offset is illustrated in FIGS. 4 and 5 as the distance d separating, on the one hand, the vertical axis $A_{10}$ intersecting the rotation axis of the roll 10 and, on the other hand, the vertical axis $A_{12}$ intersecting the rotation axis of the return wheel 12.

The offset d as represented in FIGS. 4 and 5 is strictly positive. This means that, in its travel in the direction of the arrow $F_1$, a spike 111 of the chain will firstly cross the axis $A_{10}$ of the roll 10, then the axis $A_{12}$ of the return wheel 12.

The fact that d is strictly positive means that the point of contact $P_2$ between the spike 111 and the strip of material 20 succeeds the point of contact $P_1$ of said strip of material 20 with the roll 10, with reference to the direction of movement of the strip of material and/or of the chain. Thus, when the point $P_2$ is reached, the spike 111 bears on the strip of material 20 which is immobilized against the roll 10 and the spike can effectively transmit a force of penetration into the strip of material 20.

A zero offset d can be envisaged. In this case, the axes $A_{10}$ and $A_{12}$ are aligned and the points $P_1$ and $P_2$ are one and the same.

However, it is preferable to avoid having this offset strictly negative. In practice, in this case, the spikes 111 would meet the strip of material 20 before said material was in contact with the roll 10 and the penetration of a spike 111 into the strip of material 20 would not work. To avoid such a situation, it is possible to employ spikes of greater height. However, the result of this would be that the angle of incidence of a spike into the strip of material would deviate from the perpendicular, which would not facilitate the penetration into the strip of material and would increase the risks of breakage of the spike under the effect of the shear forces.

The offset d can thus be between a zero value and a few millimetres, and may exceed a centimetre.

Beyond the point of contact $P_2$ between the spike 111 and the strip of material 20, the penetration of the spike into the strip of material 20 continues as far as a point $P_3$. To illustrate this point $P_3$ in FIG. 4(b), we have represented the same link 11 in a second position Pos2, which follows the position Pos1 in the direction of movement $F_2$ of the chain.

The point $P_3$ is situated on the axis $A_{12}$ of the return wheel, and corresponds to the position in which the strip of material 20 begins to deviate from the roll 10.

The bearing means 10, the chain 11, the strip of material 20 and the return wheel 12 are therefore in contact between the points $P_2$ and $P_3$. The area between these two points is called counter-bearing area hereinafter in the description.

The adjustment of the system depends on various parameters, namely, the offset d, the thickness e of the strip of material 20, the radius $R_{10}$ of the bearing means 10, the radius $R_{12}$ of the return wheel 12, the centre-to-centre distance E between the bearing means 10 and the return wheel 12 forming the counter-bearing means, which are represented in FIGS. 4 and 5.

The adjustment of the system also depends on the pitch P of the chain 11 and on the height h of said means 111 of driving the strip of material, which are represented in FIG. 8(a). In particular, it is important to note that the height h is defined between the centre of a rotation axis of the link and the point of a spike.

In practice, the radius $R_{10}$ of the bearing means 10, the radius $R_{12}$ of the return wheel 12 forming the counter-bearing means, the centre-to-centre distance E between the bearing means 10 and the return wheel 12, the pitch P of the chain 11, the height h of a means 111 of driving the strip of material are set beforehand, while the system is being designed and manufactured.

Also, to adjust the system before it is put into operation given the thickness of the strip of material 20 to be conveyed, the value of the offset d can be adjusted to ensure a good penetration of the spikes 111 of the chain into the strip of material 20.

A system could be provided for which the adjustment parameter is different. However, the offset d is a parameter that is relatively easy to adjust.

FIG. 6 represents a second embodiment of a system according to the invention.

This second embodiment is distinguished from the first embodiment by the fact that it implements a bearing means 10 formed by a plate having three successive faces 101, 102, 103 of contact with the strip of material 20, in place of the roll. The other parts forming the system of this second embodiment are the same as those of the first embodiment.

The first face 101 is planar. The second face 102, downstream of the first face with reference to the direction of movement $F_1$ of the strip of material, is incurved. The third face 103, downstream of the second face 102, still with reference to the direction of movement $F_1$ of the strip of material, is also planar. The first planar face 101 is inclined relative to the other planar face 103.

In operation, the third face 103 is generally arranged in a horizontal position.

Thus, the inclined face 101 has an angle of inclination relative to the horizontal which is comparable to the angle of attack of the strip of material 20 on the roll 10 relative to the horizontal in the first embodiment. As for the incurved face 102, this has a radius of curvature comparable to the radius of the roll 10 implemented in the first embodiment.

Thus, the stresses applied by the plate 10 on the strip of material 20 are the same as those applied by the roll 10, implemented for the first embodiment, on this strip of material 20.

On the system represented in FIG. 5, the axis $A_{12}$ of the return wheel 12, which is defined as previously, is the same as an axis $A_{10}$.

The axis $A_{10}$ is defined as being the axis perpendicular to both the rotation axis of the return wheel 12 forming the counter-bearing means and to the line of contact between the incurved face 102 of the plate 10 and the third face 103 of this plate 10. Generally, the axis $A_{10}$ will therefore be a vertical axis.

By analogy with the first embodiment of the invention, this means that there is no offset d between the plate 10 and the return wheel 12. Such an offset could, however, be envisaged for the adjustment of the system according to the thickness e of the strip of material 20, by displacing, for example, the return wheel 12 forming the counter-bearing means in the direction of movement of the strip of material 20 (arrow $F_1$) relative to the plate 10.

It will thus be understood that the second embodiment is able to offer a counter-bearing area, the extent of which is at least equal to that proposed by the first embodiment.

Regardless of the embodiment envisaged, the system implements a link chain, certain links of which comprise a spike judiciously arranged on each link concerned, as is explained hereinafter in the description.

A chain 11 that might be employed is, for example, represented in FIG. 7.

This chain 11 is a single chain for which a spike 111 is present at regular intervals. In the case in point, the interval between two spikes represents four times the pitch P of a link of the chain.

The interval between two spikes of the chain could, however, be irregular and/or at greater or lesser frequencies.

The link chain 11 could be a double or triple chain, namely chains respectively comprising at least two or three rows of links.

Furthermore, although a single chain is represented in the various figures, a chain 11 can be provided either side of the bearing means 10, that is to say, according to the embodiment envisaged, at each of the two ends of the roll 10 or of the plate 10.

A link of the chain of FIG. 7 is represented in FIG. 8(a). In this example, given by way of indication, the pitch P of the chain 11 is approximately 15.9 mm, the height h of a spike 111 is approximately 9.45 mm, and the thickness $e_p$ of the spike is approximately 1.7 mm.

This link comprises a spike 111, preferentially having a symmetrical shape, off-centre to the right of a rotation axis of the link, and more specifically on the rear rotation axis of this link, with reference to the direction of movement $F_2$ of the chain 11 on the return wheel 12.

This spike 111 is also represented, in an enlarged side view, in FIG. 8(b).

As can be seen, it is proposed to move the spike from the centre of the link toward the rear of this link, so increasing the extent of the counter-bearing area and, consequently, ensuring a good penetration of the spikes 111 into the strip of material 20. This is associated with the fact that the counter-bearing means is a wheel, in this case a return wheel, and no longer a plate as in the prior art.

Figure 2:
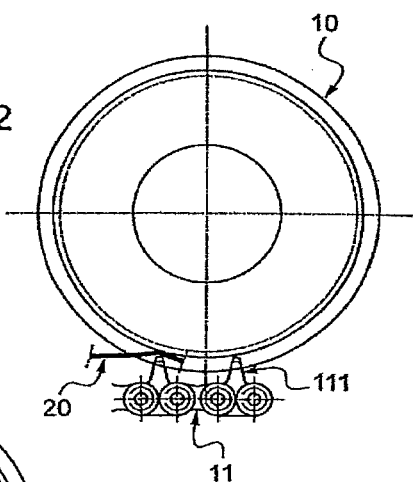
FIG. 2 represents an enlarged view of the system of FIG. 1.
Figure 3:
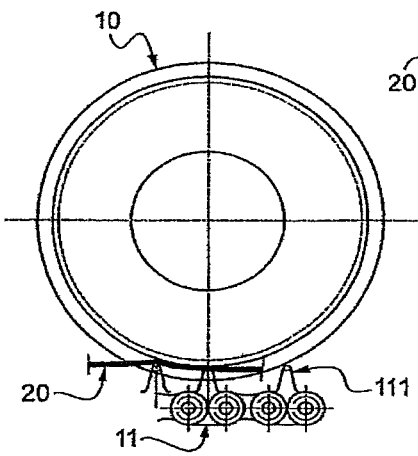
FIG. 3 represents an enlarged view of the system of FIG. 1.

Furthermore, to ensure that the angle of incidence of a spike into the strip of material is not too far away from the perpendicular to this strip of material, the applicant proposes reducing the height of the spike. In practice, the height of the spike is reduced by a factor of between 2 and 3 relative to the height of a known spike, for example illustrated in FIG. 2.

Incidentally, reducing the height of the spike saves material in the production of the chain.

As a variant, a spike height similar to the existing spikes could be retained.

The invention claimed is:

1. System (1) for conveying a strip of material (20) deprived of perforations, comprising:
    a bearing means (10) for the strip of material (20);
    at least one chain (11) provided with at least one spike (111) for driving the strip of material (20);
    at least one return wheel (12) for the chain (11) to position the chain (11) facing the strip of material (20);
    characterized in that the bearing means (10) is a plate comprising an incurved face (102), a first planar face (101) upstream of the incurved face (102), and a second planar face (103) downstream of the incurved face (102), said planar faces (101, 103) being inclined relative to one another and the return wheel (12) forms a counter-bearing means, wherein the chain (11) is pressed toward the plate by the counter-bearing means and the at least one spike (111) for driving the strip of material is pressed against the strip of material by the counter-bearing means to press the strip of material on the plate where pressing occurs and permit the at least one spike (111) for driving the strip of material to penetrate into the strip of material (20) where the strip of material is being pressed on the plate and drive the strip of material (20); an axis of the bearing means being defined as that which is perpendicular to both the rotation axis of the return wheel (12) and to the line of contact between the incurved face (102) of the plate (10) and the planar face (103) situated downstream of the incurved face (102) so that the first planar face (101) comes into contact with the strip of material at a point situated upstream, with reference to the direction of the movement of the strip of material, of the axis of the bearing means and the return wheel (12) is arranged, relative to the plate (10) forming the bearing means for the strip of material, so that there is a positive or zero offset d, taken in the direction of movement of the strip of material, between the rotation axis of the return wheel (12) and the axis of the bearing means.

2. The system for conveying a strip of material according to claim 1, in which the return wheel (12) is motor-driven.

3. The system for conveying a strip of material according to claim 1, in which the link chain (11) is a single, double or triple chain.

4. The system for conveying a strip of material according to claim 1, in which a chain (11) is provided at either side of the bearing means (10).

5. The system for conveying a strip of material according to claim 1, in which the chain (11) has a pitch of between 5 mm and 80 mm, the pitch being defined as the distance separating the two rotation axes of a link of the chain.

6. The system for conveying a strip of material according to claim 1, wherein the chain comprises a plurality of chain links, in which each of the links of the chain have two rotation axes and a plurality of spikes, each spike being off-center on one of the chain links above one of the two rotation axes of the chain link on which it is mounted.

7. The system for conveying a strip of material according to claim 1, in which the at least one spike (111) for driving the strip of material has a symmetrical shape.

8. The system for conveying a strip of material according to claim 1, in which the at least one spike (111) for driving the strip of material each have a height of less than 10 mm.

* * * * *